April 15, 1930. S. M. HERSHBERG 1,754,890
COMBINATION PRINTING CAMERA AND PAPER SUPPLYING MECHANISM
Filed July 9, 1926 3 Sheets-Sheet 2
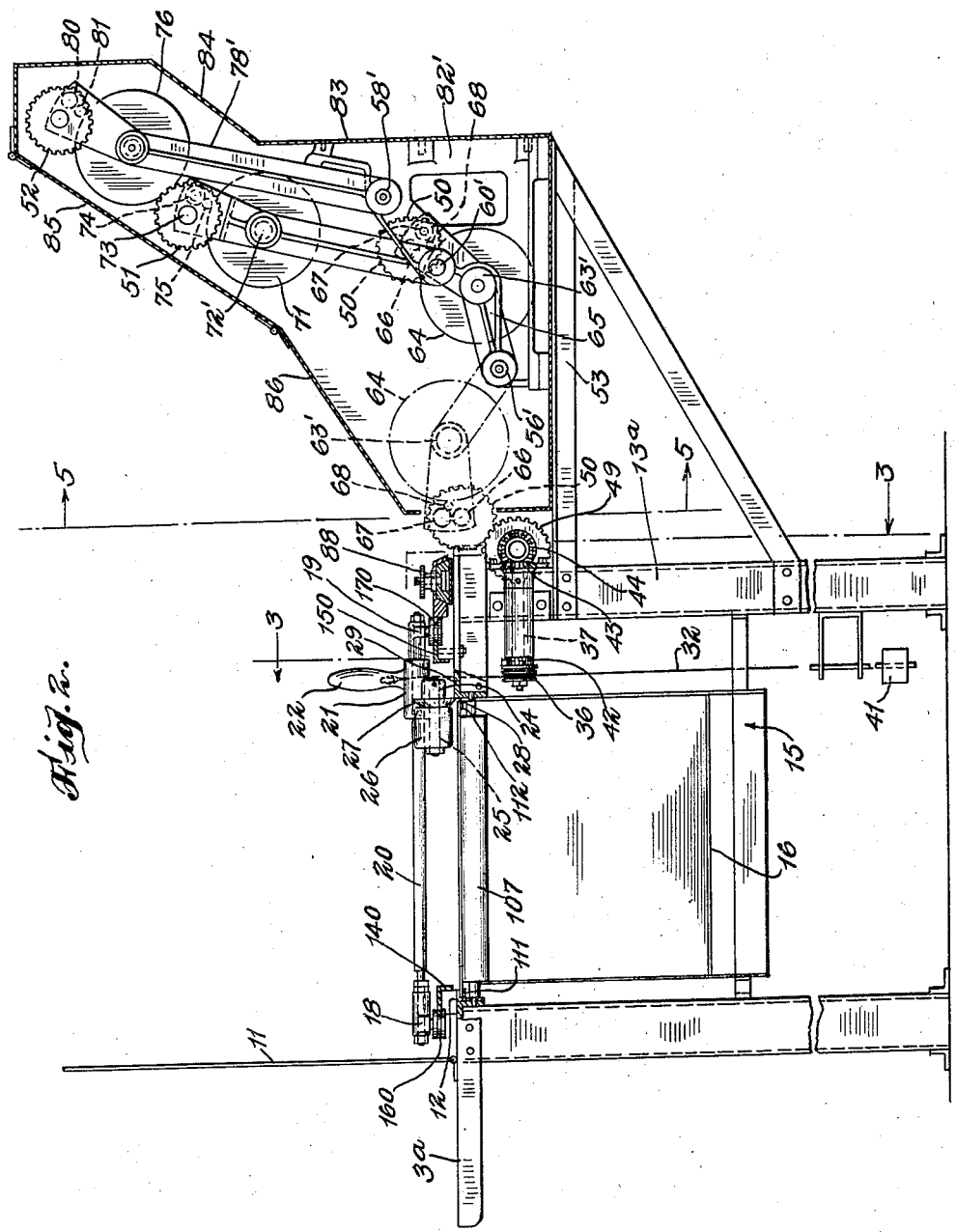
Inventor
SAMUEL M. HERSHBERG.
By his Attorney April 15, 1930. S. M. HERSHBERG 1,754,890
COMBINATION PRINTING CAMERA AND PAPER SUPPLYING MECHANISM
Filed July 9, 1926 3 Sheets-Sheet 3
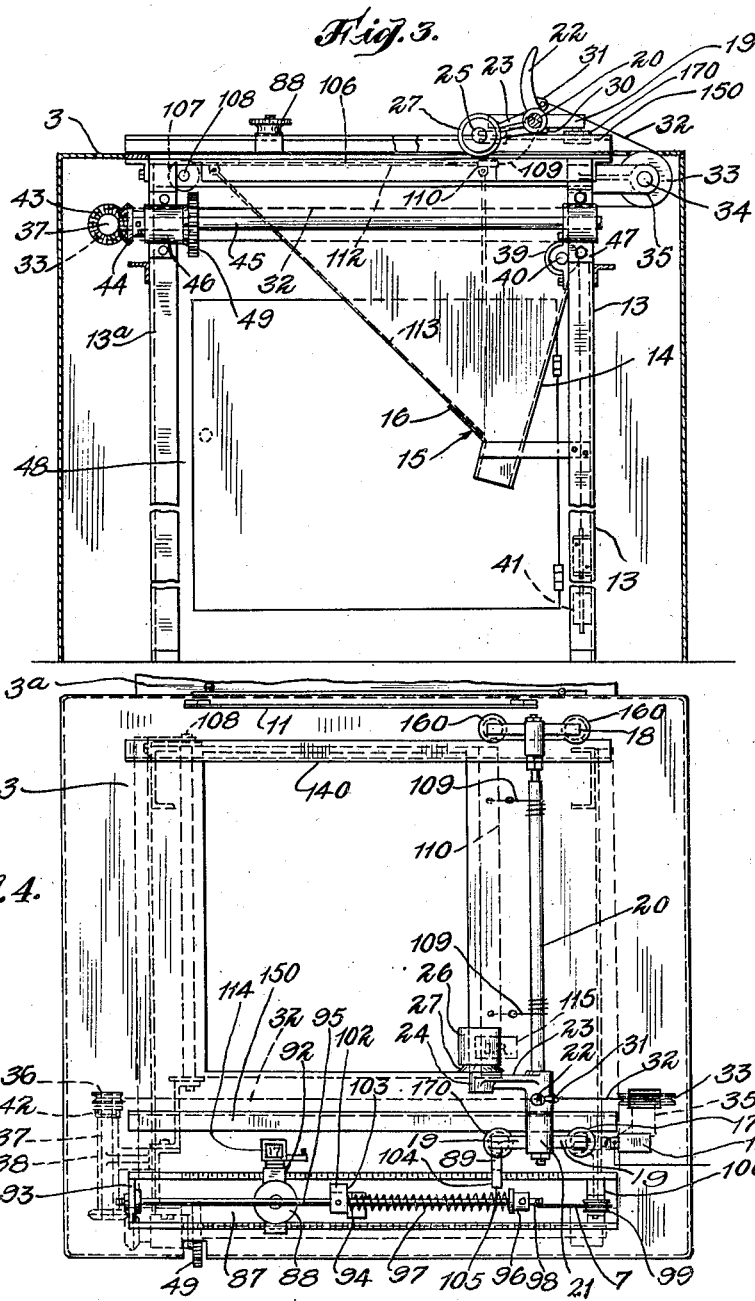
Inventor
SAMUEL M. HERSHBERG.
By his Attorney
Gustav Drews Patented Apr. 15, 1930

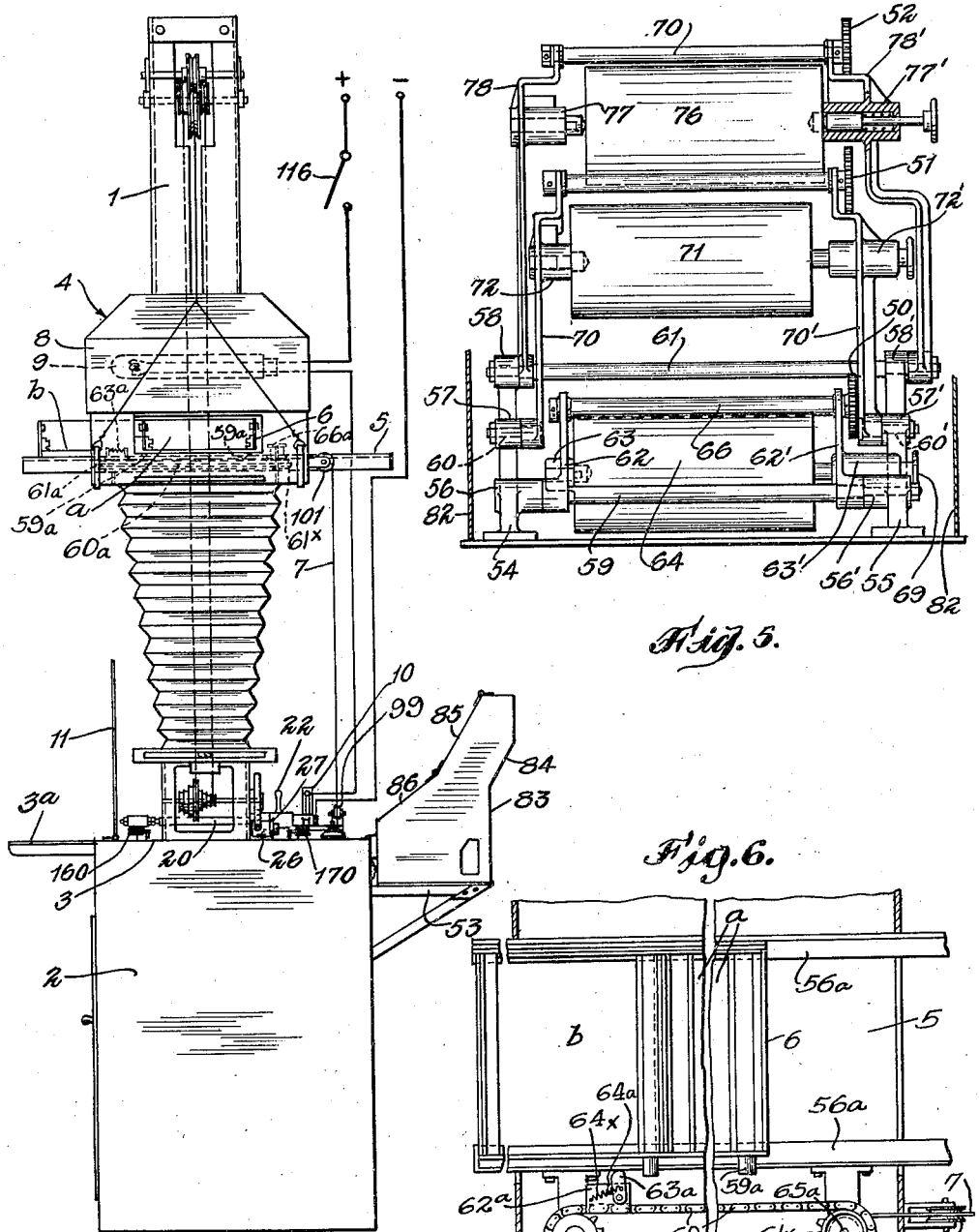

1,754,890

UNITED STATES PATENT OFFICE

SAMUEL M. HERSHBERG, OF BROOKLYN, NEW YORK

COMBINATION PRINTING CAMERA AND PAPER-SUPPLYING MECHANISM

Application filed July 9, 1926. Serial No. 121,333.

This invention relates in general to photographic machines and more particularly to devices for reproducing prints on sensitized paper or the like from photographic plates or films.

Among the objects of the present invention, it is aimed to provide a device having a support for sensitized paper, means for automatically feeding the required length of sensitized paper into position for printing, means for cutting off the length of paper required after it has been printed, means for depositing the cut-off printed sheet, and means for packing the same in an orderly manner.

Among other objects of the present invention, it is also aimed to provide a combination printing camera and cut-off mechanism in which the required length of film for the print to be reproduced is automatically fed into position, or the photographic plate automatically fed into position, the required length of sensitized paper fed into position, the electric current for the camera lamp automatically turned on before printing, the current also automatically turned off after printing, the required length of sensitized paper cut off after printing, and the cut-off sheet removed.

It is also aimed to provide a device of the character described in which a temporary support for the sensitized paper is positioned for supporting the length of paper to be printed, the required length of paper automatically fed into position on the support, the electric current for the camera lamp automatically turned on before printing, the electric current also automatically turned off after printing, the required length of sensitized paper cut off after printing, and the support for the sensitized paper withdrawn to permit the cut-off sheet to be automatically dropped into the initial receptacle and the cut-off sheets thereafter automatically removed from the initial receptacle and discharged into another receptacle.

Among other objects of the present invention, it is also aimed to provide a device for controlling the film or slide carrier of a printing camera, such as illustrated in my copending application Serial No. 114,929, filed June 10, 1926, and also for controlling a device for feeding sensitized paper into position to be printed, turning on the electric current for the camera lamp before printing, turning off the electric current for the camera lamp after printing, and positioning a support for the sensitized paper before printing and removing such support after printing to permit the sensitized paper automatically to be discharged.

Specifically the present invention also aims to provide an attachment for devices of the character described having a plurality of supports for sensitized paper rolls and provision made for expeditiously manipulating any one of such supports singly, exclusively of the others, to associate them in operative position with a paper feeding device.

These and other features, capabilities and advantages of the invention will appear from the subjoined detail description of one specific embodiment thereof illustrated in the accompanying drawings, in which Figure 1 is an assembly view showing a reproducing camera associated with the paper feeding mechanism;

Fig. 2 is a front end elevation of the device for feeding, cutting off, and depositing sensitized sheets of paper;

Fig. 3 is a side elevation of a portion of the machine taken, substantially on the line 3—3 of Fig. 2;

Fig. 4 is a plan view of the portion of the machine illustrated in Fig. 3;

Fig. 5 is a side elevation of a part of the mechanism illustrated in Fig. 2, substantially on the line 5—5 of Fig. 2; and Fig. 6 is an enlarged detail showing the mounting of the negative carriers.

In the embodiment illustrated in Fig. 2, there is shown a vertically extending bracket 1 to the front of which at the lower end thereof there is provided a housing 2 having an upper platform, defined generally by the reference character 3. Above the platform 3 and slidably connected to the bracket 1 there is provided a vertically adjustable reproducing camera, generally designated by the reference character 4, substantially as illustrated in my copending application, Serial No. 114,929, filed June 10, 1926. In the camera 4 there is provided a platform 5 on which there is slidably mounted a series of negative carriers, such as the film carriers or photographic plate carriers 6, two being shown in the present instance. In the operation of this device, after the film or plate positioned in the first plate carrier *a* has been acted upon, the cable 7 which is operatively connected to the plate carriers 6, is actuated to advance the train of carriers 6 so that the next slide carrier *b* will be in position to have the slide or plate therein acted upon. Above the slides 6 there is positioned a lamp housing 8 in which a lamp 9 is positioned which is connected by suitable conduits to a source of current, one of the conduits of which is provided with an open switch at 10, which switch 10 will be closed when printing is to be done to light the electric lamp 9 and which switch is to be automatically open to shut off the light after printing has taken place. The housing 2 has to the left thereof a working bench or platform $3^a$ extending from the level of the platform 3 and disposed between the extension $3^a$ and the platform 3 there is provided an upwardly extending vertical shield 11. The housing 2 is substantially closed on all four sides and has a substantially rectangular opening 12 formed in its upper surface. Extending rearwardly and forwardly from the rear wall 13 of the housing 2, see Fig. 3, there is an inclined deflector 14 which has spaced therefrom to the front of it a guide 15 having an upper forwardly inclined ledge 16.

In Fig. 6, the platform 5 is shown provided with parallel tracks $56^a$, $56^a$. Upon such tracks $56^a$, $56^a$, there is slidably supported the negative carrier 6. In the present instance, the carrier 6 is provided with the projecting studs $59^a$, which are spaced apart a distance equivalent to the length of travel desired between the removal of a negative and the positioning of the succeeding negative. In order to impart shifting movement to the negative holder or a train of holders provided with the projecting studs $59^a$, there is provided at one side of the tracks $56^a$ an endless chain $60^a$ carried by the sprockets $61^a$, $61^x$. Mounted upon chain $60^a$ is a bracket $62^a$, the bracket carrying a pawl $63^a$ which is pivoted on the bracket and normally held against stop $64^a$ by a light spring $64^x$. The rear side face of pawl $63^a$ is bevelled. Sprocket $61^x$ is freely movable upon a supporting shaft $65^a$ and the sprocket is secured to a small drum $66^a$ also movable upon the said shaft. A coiled spring $67^a$ has one end secured to the drum and the opposite end secured to the shaft. The operating cable 7 is wound upon drum $66^a$ and thence passes over the guide pulley 101 to the sheave 99.

It will be seen that when cable 7 is drawn out to rotate drum $61^a$, a corresponding rotation will be imparted to sprocket wheel $61^x$ thereby moving chain $60^a$ in such manner that pawl $63^a$ will engage lug $59^a$ and bodily shift the negative holder to the right for the required distance. Upon release of cable 7, coil spring $67^a$ will return drum $66^a$ to its initial position, thereby reversing the rotation of sprocket wheel $61^x$, the chain carrying pawl $63^a$ to the left. When the pawl meets the preceding lug $59^a$, its bevelled face will enable it to readily slip past the lug by rotation on its pivot against the tension of spring $64^x$, the spring immediately returning the pawl to its vertical position as illustrated in Fig. 6. When a tray or carrier 6 contains negatives in both holders *a* and *b*, and it is desired to take further prints of the same negatives, the entire carrier 6 may be returned to its left position by hand, or else, when another set of negatives are to be printed, the carrier 6 may be removed and another carrier substituted.

To the left and right sides of the opening 12, there are formed rails 140 and 150 respectively. The rails 140 and 150 have outwardly extending track edges to receive the rollers 160 and 170 respectively.

The rollers 160 are rotatably mounted on the lower part of the bracket 18 and the rollers 170 are rotatably mounted on the lower end of the bracket 19. The brackets 18 and 19 are connected to one another by the rod 20. Adjacent to the bracket 19 and pivotally mounted on the rod 20 there is provided a bracket 21 having an upwardly extending handle 22 and a forwardly extending arm 23 terminating in the journal 24 for the stud shaft 25 on which a felt roller 26 is rotatably mounted. Between the felt roller 26 and the journal 24 there is rotatably mounted a rotary knife blade 27. As shown in Fig. 2, the right hand cutting edge of the knife blade 27 when depressed in cutting operation is disposed to operate adjacent to the inner face 28 of the angle bar 29. It will also be seen by reference to Fig. 3, that in cutting position, the stub shaft 25 of the knife 27 is positioned at a lower level than the rod 20. From the lower end of the bracket 21 and extending rearwardly from the arm 23 there is provided a cam 30 adapted to cooperate with the upper surface of the rail 150 so as to frictionally hold the bracket 21 in any position along the rail 150 when the handle 22 is bent rearwardly, to wedge the cam 30 into engagement with the rail 150. The rear edge of the handle 22 has formed thereon an ear 31 above the rod 20 to have connected thereto a cable 32. By so positioning the ear 31 relative to the rod 20, tension on the cable 32 in a downward direction and rearwardly will tend to swing the bracket 21 thereby to raise the arm 23 and therewith the roller 26 and rotary knife 27. In line with the ear 31 but below the same, there is provided a sheave 33 mounted on the shaft 34, the shaft 34 being journaled in the bearing 35 suitably secured to the outside of the housing 2, as shown in Fig. 3. The cable 32 extends from the ear 31 over the sheave 33 and then passes forwardly to the sheave 36 mounted on the shaft 37, the shaft 37 being journaled in the bearing 38 connected to the front wall 13ª of the housing 2, as shown in Fig. 2. From the sheave 36, the cable again passes rearwardly to the sheave 39 mounted on the shaft 40 suitably secured in a bracket attached to the housing 2, see Fig. 3. From the sheave 39 the cable 32 passes down adjacent the wall 13 of the housing 2 and has connected at its lower end suitable weights 41. By means of the weights 41, after the bracket 21 has been moved forwardly by engagement of the handle 22 and the handle thereupon released, the weights 41 will automatically return the bracket 21 to its rearward position, at the same time tilting the bracket 21 so that it will raise the roller 26 and rotary knife 27. The movement of the cable 32 over the sheave 36 will at the same time cause the shaft 37 to be rotated in one direction to operate the feed mechanism now to be described.

Between the bearing 38 and the sheave 36, there is provided a ratchet mechanism 42 co-operating between the shaft 37 and the sheave 36 so as to cause the shaft 37 to be rotated with the sheave 36 when the bracket 21 moves rearwardly, and whereby the shaft 37 will remain held when the bracket 21 is moved forwardly. On the right hand end of the shaft 37, there is provided a bevel gear 43 in mesh with a bevel gear 44, the bevel gear 43 and ratchet mechanism 42 being fixed to travel with the shaft 37 while the sheave 36 is rotatably mounted on the shaft 37. The bevel gear 44 is fixed on the shaft 45 which is journaled in the bearings 46 and 47 suitably secured to the front and rear ends respectively of the right hand wall 48 of the housing 2. On the shaft 45 there is also fixed a pinion 49 disposed rearwardly of the bracket 46, as shown in Fig. 3. The teeth of the pinion 49 are cut to mesh with any one of the pinions 50, 51 and 52 of the supports for the sensitized paper.

In practice, it has been found in the art of photography, that depending upon the character of the negative, different characters of sensitized paper are to be used. In other words, for indistinct negatives, a more sensitively coated paper is required in order to obtain the desired result. In view thereof, it has been customary in the art of photography to use at least three different grade of sensitized paper. So that these different grades of paper may be used with the present device without requiring extensive readjustment, the paper roll supporting mechanism now to be described has been provided.

The supporting mechanism is mounted on the auxiliary platform 53 extending from the right hand wall 48 of the housing 2. As shown in Fig. 5, two bearing brackets 54 and 55 are provided extending upwardly from the rear and front edges respectively of the platform 53. The bearing brackets 54 and 55 have three sets of alined journals 56, 56', 57, 57', and 58, 58', the bearings 56 and 56' supporting the shaft 59 at the lowest level and next to the housing 2, the bearings 57 and 57' supporting the stub shafts 60 and 60' at the higher level and further spaced from the housing 2, and the bearings 58 and 58' supporting the shaft 61 at the highest level and at the furthermost distance removed from the housing 2.

On the shaft 59 there are pivotally mounted two brackets. Adjacent to the journals 56 and 56' there are provided two arms 62 and 62' respectively. The arms 62 and 62' are provided with journals 63 and 63' having stub shafts to receive the core of the paper roll 64. The journal 63' is elongated, as shown in Fig. 5, and when the roll 64 is swung into neutral position, away from the housing 2, the journal 63' will rest in the recess 65 formed in the bracket 55. The arms 62 and 62' also have journals formed at their free ends to receive the shaft 66, on the front end of which there is fixedly secured a pinion 50. The shaft 66 forms one of the feeding rollers for the paper on the roll 64 and is frictionally maintained in engagement with the roll 67 also mounted in the free ends of the arms 62 and 62'. To one side of the roll 67 there is provided a third roller of smaller diameter also mounted in the arms 62 and 62' which latter roller, designated 68, serves as a paper straightening device. For frictionally maintaining the core of the roller 64 against free rotation on the stub shafts mounted in the journals 63 and 63', the stub shaft mounted in the journal 63' is spring pressed and controlled by the handle 69. The length of the arms 62 and 62' is such that when the arms are swung toward the housing 2, the pinion 50 thereon will mesh with the pinion 49 and, consequently, when the bracket 21 is moved rearwardly, the pinion 50 will be rotated in turn to rotate the roller 66. The paper from the roll 64 will pass under the roller 68 and between the rollers 66 and 67 over to the top of the platform 3, the roller 68 serving to exercise a curved and bent tension on the paper so that, as it passes between the rollers 66 and 67, it will serve to straighten out the same and to straighten out the curve formed in the same while wrapped on the roll 64.

When it is desired not to use the paper from the roll 64 but to use paper of a different grade, it is only necessary to swing the bracket arms 62 and 62' to the right so that the journal 63' rests in the recess 65.

On the stub shafts 60 and 60' there are pivotally mounted the arms 70 and 70' respectively of the next succeeding roll of paper 71. The arms 70 and 70' are disposed to extend between the arms 62 and 62' and the brackets 54 and 55, as shown in Fig. 5. At a short distance removed from the free ends of the arms 70 and 70', there are provided journals 72 and 72' having stub shafts to receive the core of the paper roll 71. The stub shafts of the journals 72 and 72' and the means for moving the paper roll 71 are substantially identical to the means for moving the paper roll 64 and will not again be described. At the free ends of the arms 70 and 70' there is a feed roller 73 forming the shaft for the pinion 51. Adjacent to the feed roller 73 there is provided another feed roller 74 and a straightening roller 75, the rollers 73, 74, and 75 being substantial duplicates of the rollers 66, 67, and 68. When the paper roll 71 is to be used, the bracket arms 70 and 70' are merely swung to the left so that the pinion 51 will mesh with the pinion 49 whereupon the paper from the roll 71 may be fed to the platform 3. The uppermost paper roll 76 has its core secured to the journals 77 and 77' formed on the arms 78 and 78', respectively, pivotally mounted on the shaft 61. At the upper ends of the arms 78 and 78' there is rotatably mounted a feed roller 79 the diminished end of which has secured thereto the pinion 52. Adjacent to the feed roller 79 there is provided a feed roller 80 and a straightening roller 81, the rollers 79, 80, and 81 operating substantially like the rollers 66, 67, and 68, and cooperating with the paper from the paper roll 76 to feed the paper from such roller to the platform 53 when the pinion 52 meshes with the pinion 49.

The stub shafts in the journals 77 and 77' and the means for moving the paper roll 76 are similar to the means for moving the paper roll 64.

Since the paper on the rolls 64, 71 and 76 is sensitive to light, it is desirable to enclose the paper supporting mechanism in a housing. For this purpose there extends from the sides of the platform 53 to either end of the brackets 54 and 55, the side walls 82 and 82' and from the rear of the platform 53, the rear wall 83 having an upward extension 84. At the upper end of the extension 84, there is hingedly connected the cover member 85 which has pivotally connected to its free edge the cover member 86 which cover members 85 and 86 may be folded down into engagement with the edges of the walls 82 and 82', as shown in Fig. 2, to enclose the paper rolls 64, 71 and 76. It will be noted that the arm 78 extends upwardly between the bracket 54 and the arm 70 and that the arm 78' extends upwardly outside of the bracket 55 in order to clear the pin extending from the journal 72'.

The distance of movement of the bracket 21 relative to the length of paper to be fed is predetermined, and for this purpose, there is provided an indicating bar 87 which is graduated, as shown in Fig. 4, and a stop 88 adjustably mounted on said bar 87 to form an abutment for the projection 89 formed on the arm 90. The arm 90 is secured to the hub 91 receiving the shaft 20 and traveling with such shaft 20 during the movement of the bracket 21. The face 92 of the stop mechanism 88 is engaged by the projection 89 to limit the movement of the bracket 21, and, consequently, the extent of movement of the bracket 21 will be determined by the position of the stop mechanism 88 on the indicating bar 87.

So that the film may be automatically fed with the control of the paper feed, the mechanism now to be described has been provided.

On the indicating bar 87 and upwardly extending therefrom, there are provided two brackets 93 and 94 to slidably support the rod 95. The bracket 94 is disposed about midway of the length of the indicating bar 87 and the rod 95 normally extends rearwardly beyond the bracket 94. On the rear end of the rod 95 there is formed an enlargement 96. Between the enlargement 96 and the bracket 94, there is provided a coil spring 97 normally pressing the enlargement 96 rearward of the bracket 94. The enlargement 96 has an ear 98 to which there is connected the lower end of the cable 7. From the ear 98, the cable 7 passes over the sheave 99 journaled in the bracket 100 on the rear end of the indicating bar 87. From the sheave 99, the cable 7 passes up to the sheave 101 on the platform 5 of the reproducing camera 4.

Between the brackets 93 and 94 on the rod 95, there is adjustably mounted the projection 102, the face 103 of which forms an abutment for the face 104 of the projection 105 extending from the projection 89 of the arm 90.

From the foregoing, it will be seen that, depending upon the length of movement of the film carrier 6 to be advanced for each successive reproduction, the stop 102 will be set on the rod 95.

In the operation of the mechanism just described, it will therefore be seen that when the bracket 21 is moved toward the front of the machine, it will initially draw up the weights 41 by means of the cable 32, the ratchet mechanism 42 permitting the feeding mechanism to remain at rest during such forward movement, and that as the projection 104 engages the face 103 on the stop 102, it will move the rod 95 with it against the tension of the spring 97 until the projection 89 engages the face 92 of the stop mechanism 88. During such advance movement with the stop 102, the cable 7 will be pulled, in turn to advance the slide or film carrier to position the desired film or slide in position for printing. Thereupon, when the handle 22 is released, the weights 41 will retract the bracket 21 during which movement the feeding mechanism will be actuated through the ratchet mechanism 42 to advance the length of sensitized paper desired. When the bracket 21 is in its rearmost position, the rear end of the bracket 19 will engage and close the switch 10 for the electric circuit controlling the lamp 9 and permit the printing to begin. After the printing has been finished, it is merely necessary to grip the handle 22 and again move it forwardly. When so moved forwardly, it will depress the rotary knife 27 and the paper at the time being positioned on the platform 3 and across the rail 29 will be cut along the line adjacent to the rail 29.

In order to close the opening 12 and support the paper as it is fed across the opening 12, there is provided a supporting member preferably consisting of a shade 106 secured to a shade roller 107 rotatably mounted at 108 to the housing 2 in the usual way. The front edge of the shade roller 106 is connected to the rod 20 by any suitable means, such as the cable 109 connected to the bar 110 at the front edge of the shade 106. The bar 110 is slidably mounted on the rails 111, 112, disposed adjacent to the right and left hand edges of the opening 12, see Fig. 2. To the bar 110 there is preferably hingedly connected the shield 113 which extends down to the guide 15, with its lower free end resting on the portion 16 when the shade is in its rolled up position and with its lower free end extending down into the space formed between the guide 15 and the deflector 14 when in its open position.

From the foregoing, it will be seen that the paper is being fed onto the shade 110 while the shade is moving into extended or open position, and that while the printed sheet is being cut, the shade 110 is being withdrawn into closed position to permit the cut sheet to drop into the receptacle, there to rest on the shield 113 or to slide down below it between the guide 15 and deflector 14. Furthermore, as the shade is being opened, and the bracket 21 moves rearwardly to feed a succeeding length of paper, the shield 113 serves as a packer for the last deposited cut-off sheet to pack or deflect it down between the guide 15 and deflector 14.

It is also desirable when making a number of prints from a single film that a counter be provided for automatically registering the number of prints being produced. In this case, it may be desired to disconnect the cable 7 so that the film or photographic plate may remain in position until the required number of prints are made. Such counter 114 can conveniently be mounted on the stop mechanism 88, as shown in Fig. 4, where a standard counter is illustrated.

It may also be desirable to have printed on the rear face of the print being produced the stamp of the character of the print, the name of the photographer, and the like. For this purpose, a printing stamp 115 may be secured adjacent to the right rear end of the opening 12, in the path of movement of the roller 26, so that the roller 26 may pass over the printing pad and impress the printing stamp onto the print. The stamp may be located either below or above the path of movement of the paper and is normally maintained out of engagement with the same, but yieldable to permit the roller 26 when depressed during the forward movement thereof, to engage the stamp and actuate it into engagement with the paper. During the return rearward movement of the roller 26, it will be raised due to the tilting of the bracket 21 by the cable 32 and, consequently, clear the stamp during such return movement.

Preferably a main switch 116 is connected to the conductors for the lamp 9 so that the same may be shut off when the printing machine is out of use.

It is obvious that various changes and modifications may be made to the details of construction without departing from the general spirit of the invention, as set forth in the appended claims.

I claim:

1. The combination with a frame, of a fabric to form a support for paper to be printed by a camera, driving mechanism mounted on said frame and operatively connected to position said movable fabric before printing and withdraw said movable fabric after printing, a bracket mounted on said frame, bearings on said bracket for supporting a roll of sensitized paper, feed rollers secured to said bracket in position to receive the paper from the roll mounted on said bearings, and an operative connection associated with said feed rollers, said bracket being pivotally mounted to connect said operative connection with said driving mechanism.

2. The combination with a frame having a support for sensitized paper to be printed by a printing camera, of a plurality of brackets pivotally connected to said frame and nested within one another in neutral position, sensitized paper mounted on each of said brackets, driving mechanism mounted on said frame, feeding means secured to each of said brackets for feeding the paper from said roll, and operative connections on each of said brackets, said brackets being pivotally mounted singly to be swung into position to connect the operative connection of one bracket with the driving mechanism to the exclusion of the other brackets to permit said driving mechanism to actuate said feeding means to feed the paper from said bracket onto said support.

3. The combination with a frame having a support, of driving mechanism on said frame, a plurality of brackets pivotally connected to said frame and nested within one another in neutral position, a roll of sensitized paper mounted on each of said brackets, feeding means secured to each of said brackets for feeding paper to said support, and operative connections on each of said brackets associated with said feeding means, said rolls being mounted on said brackets relative to one another to clear one another when a bracket is swung into position to connect its operative connections with said driving mechanism to the exclusion of said other brackets to permit said driving mechanism to actuate said feeding means to feed the paper of said roll onto said support.

4. The combination with a frame having a support, of driving mechanism mounted on said support; a plurality of brackets pivotally connected to said frame, each of said brackets having a roll of sensitized paper mounted thereon, feeding means mounted on each bracket, and an operative connection associated with said feeding means mounted on each bracket; said rolls being positioned relative to one another to clear one another when a bracket is swung into position to associate its operative connection with said driving mechanism to cause the paper on such bracket to be fed to said support.

5. The combination with a frame having a container open at the top, of a support slidably mounted to close said top, means for feeding a length of sensitized paper onto said support into position to be printed by a printing camera, a guide in said container, a shield pivotally connected to the end of said support and extending down into said guide, the length of paper falling through said opening onto said shield when said support is actuated to free said opening, and said shield guiding said length of paper to slide through said guide into said container.

6. The combination with a frame having a container open at the top, of a support slidably mounted on said container to close said opening, means for feeding a length of sensitized paper into position on said support to be printed by a printing camera, a bracket slidably mounted on said frame, a rotary knife rotatably mounted on said bracket to cut the length of paper positioned on said support after printing, a roller operatively mounted on said bracket, a printing stamp yieldably mounted in the path of movement of said roller and above said paper to be engaged by said roller and form an impression on said paper, and means for actuating said support after said rotary knife has functioned to permit the length of paper so cut to drop into said container.

7. The combination with a frame having a container open at the top, of a support slidably mounted on said frame to close said opening, means for feeding a length of sensitized paper onto said support into position to be printed by a printing camera, a bracket slidably mounted on said frame, a rotary cutter on said bracket operable to cut the required length of paper when said bracket is caused to traverse said frame, a counter located at one extremity in the path of movement of said bracket to be actuated by said bracket every time the bracket is caused to traverse said frame in one direction, and means for actuating said support after said cutter has functioned to permit the length of paper so cut to drop into said container.

SAMUEL M. HERSHBERG.